United States Patent
Ringle

[11] 3,735,233
[45] May 22, 1973

[54] BATTERY CHARGER APPARATUS HAVING MULTIPLE MODES OF OPERATION AND AUTOMATIC SWITCHING THEREBETWEEN

[75] Inventor: Richard Bertrem Ringle, Shorewood, Wis.

[73] Assignee: Globe-Union Inc., Milwaukee, Wis.

[22] Filed: Aug. 24, 1970

[21] Appl. No.: 66,187

[52] U.S. Cl. ........................320/24, 320/32, 320/39
[51] Int. Cl. ................................................H02j 7/10
[58] Field of Search....................320/39, 40, 24, 23, 320/DIG. 1, 32

[56] References Cited
UNITED STATES PATENTS

| | | | |
|---|---|---|---|
| 3,517,295 | 6/1970 | Lapuyade | 320/DIG. 1 UX |
| 3,553,561 | 1/1971 | Lesher | 320/39 X |
| 3,405,341 | 10/1968 | Buch et al. | 320/DIG. 1 UX |
| 3,018,432 | 1/1962 | Palmer | 320/39 X |
| 3,430,059 | 2/1969 | Wolff | 320/DIG. 1 UX |
| 3,517,294 | 6/1970 | Ruben | 320/24 |
| 3,521,142 | 7/1970 | Ludlam | 320/23 X |
| 3,392,317 | 7/1968 | Eberts et al. | 320/DIG. 1 UX |

Primary Examiner—J. D. Miller
Assistant Examiner—Robert J. Hickey
Attorney—Pendleton, Neuman, Williams & Anderson

[57] ABSTRACT

A battery charging device is disclosed which charges a normal battery first in a constant current mode to a first intermediate terminal voltage, then in a modulated mode to a predetermined maximum terminal voltage, and then in a standby mode at a third predetermined float voltage. When the battery is attached to the charger in the standby mode and the terminal voltage falls below a predetermined level, the charger is automatically recycled to recharge the battery. If the charge cycle is interrupted by a momentary line voltage failure or other external malfunction, the charge cycle resumes when the malfunction is corrected. A small current is applied to any battery connected to the circuit regardless of its state of charge or the immediate past history of the charger or battery in previous cyclic operation; thus an abnormally discharged battery which may exhibit a very high input impedance and does not easily accept charge is charged by this device for gradual reinstatement and subsequent normal cyclic operation.

3 Claims, 2 Drawing Figures

Patented May 22, 1973 3,735,233
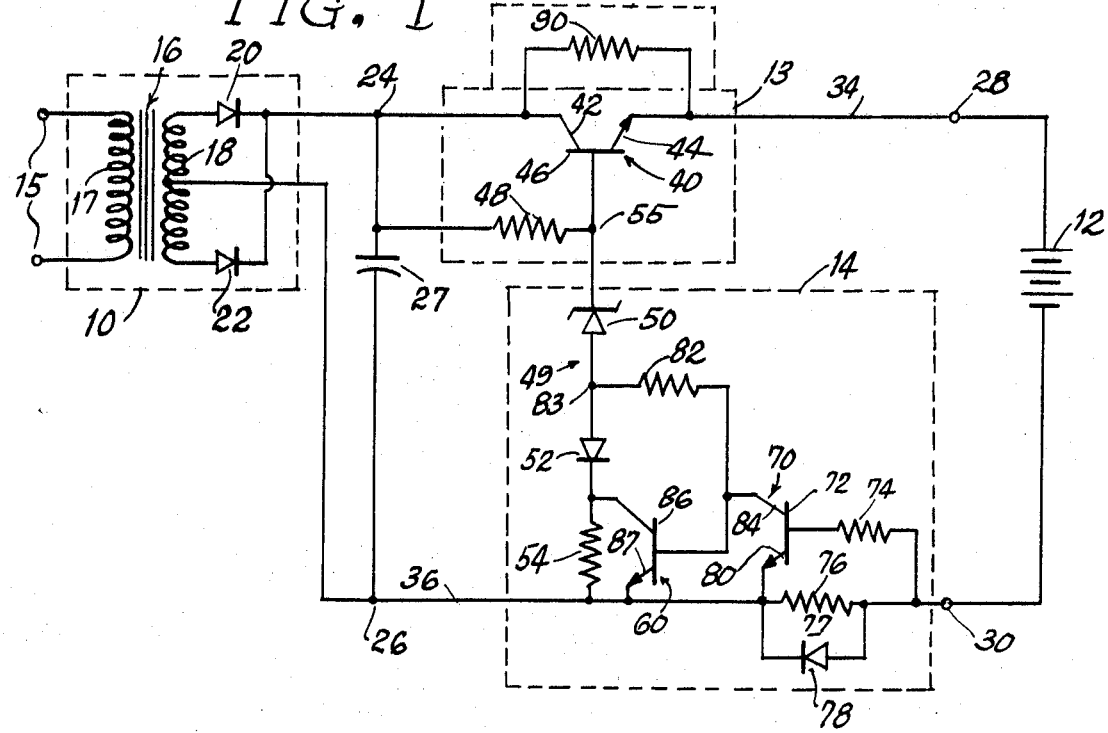
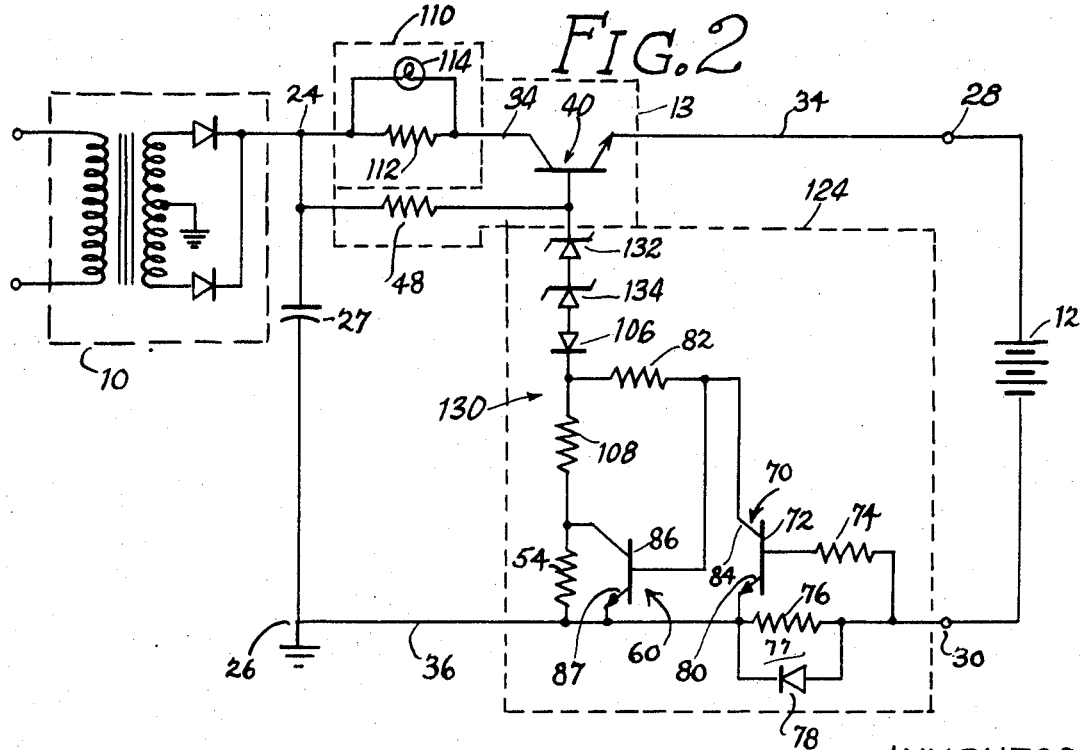
INVENTOR
Richard B. Ringle
by Pendleton, Neuman,
Williams & Anderson
Attys

BATTERY CHARGER APPARATUS HAVING MULTIPLE MODES OF OPERATION AND AUTOMATIC SWITCHING THEREBETWEEN

BACKGROUND OF THE INVENTION

The invention relates to battery chargers and more particularly to a system for automatically charging a battery to a predetermined terminal voltage and maintaining the battery in a fully charged state.

Battery operation of electrical and electronic devices has become increasingly common with the development of compact, portable equipment in many fields. Storage batteries are often used as accurate noise-free power supplies for low level measuring instruments, or are placed unattended at remote locations. However, to maintain convenience and economy in battery operation, and make full use of present day battery capabilities, means must be provided for quickly, economically and nondestructively recharging a storage or secondary battery when it is expended or discharged.

An optimum automatic battery charger must provide rapid recovery but must neither overcharge nor undercharge the battery. Prior art practices in automatic battery charging involve coupling a battery to a constant potential source substantially above the optimum battery terminal voltage for a relatively rapid charge, or applying to a battery a continuous trickle current from a relatively high impedance source to provide a relative constant charging current with a rising effective charging voltage. In the constant potential system, the battery is charged whenever its terminal voltage falls below an established threshold and then at a rapid rate. Unfortunately, if the battery is to be kept fully charged the threshold at which charging is initiated is so near the full battery potential that frequent high rate charging results with consequent deleterious gassing. A trickle current system supplies a current of low magnitude to prevent gassing, but the charge rate is so slow that it is impractical for charging a substantially discharged battery.

Efforts have been made to combine the basic two modes of charging into an automatic system, but in general optimum results have not been obtained. Typical battery charging systems involving multiple modes of operation are disclosed in the U.S. Pat. to Brown No. 3,412,308, Mandel et al. U.S. Pat. No. 3,417,308, Saslow U.S. Pat. No. 3,178,629, Medlar U.S. Pat. No. 3,443,191, and Perkins et al. U.S. Pat. No. 3,441,829. Battery charging systems having a substantially automatic cut-off are disclosed by Potter U.S. Pat. No. 3,418,553 and Grey U.S. Pat. No. 3,123,759. Other battery charging systems providing some degree of automatic charging current control have been disclosed by Swartz U.S. Pat. No. 3,440,515, Riebs U.S. Pat. No. 3,116,439, Potter U.S. Pat. No. 3,281,639, Bethke U.S. Pat. No. 3,176,210, Buchowski U.S. Pat. No. 3,405,341, Motta U.S. Pat. No. 3,414,774, Chait U.S. Pat. No. 3,193,750 and Henderson No. 3,445,744.

It is an object of this invention to provide an automatic battery charger capable of reliably obtaining and maintaining a controlled state of charge on a battery irrespective of its initial condition, with total elimination of any need for monitoring of the charging operation.

It is another object of this invention to provide a battery charger having multiple modes of operation including a standby mode so that the battery is maintained in a charged and useable state without attention or supervision.

Another object of this invention is the provision of a battery charger that is capable of charging a battery that is abnormally discharged i.e., so deeply discharged that it displays a high input impedance and does not readily accept charging current.

Another object of this invention is to provide a battery charger capable of automatically resuming the charging cycle after an interruption caused by a temporary external malfunction such as low applied line voltage.

SUMMARY OF THE INVENTION

The battery charger disclosed herein automatically supplies charging current at a maximum rate to a normally discharged battery connected across its output terminals up to a first intermediate level of battery terminal voltage. Beyond this intermediate voltage level, charging current is supplied at a modulated gradually diminishing rate until a maximum terminal voltage is present. The charger then switches to a standby mode and the voltage drops to an optimum value. When the battery terminal voltage falls below a third level, which may be the same as the first intermediate level at which modulated charging was initiated, the charge cycle is automatically recommenced.

Means are also provided in the charger to supply at least a small charging current to the battery under all operating conditions. Further, even a battery which has been subjected to such abnormal operating conditions that it exhibits a high input impedance will receive some small charging current and in time be receptive to a normal charge cycle.

IN THE DRAWING

FIG. 1 is a schematic diagram of an embodiment of a battery charger constructed in accordance with this invention.

FIG. 2 is a schematic diagram of a second or alternative embodiment of a battery charger constructed in accordance with this invention.

DESCRIPTION OF A PREFERRED EMBODIMENT

Referring to the drawing, and particularly FIG. 1, a battery charger circuit is shown coupled between a source of AC voltage 15 and a battery 12 which is to be charged. The charger includes a DC power supply 10 and means 13 for modulating the rate of charging current to the battery as a function of the terminal voltage of the battery, a so-called taper charge. The control circuit also includes switch means 14 for initiating modulation of the charging current at an intermediate battery terminal voltage and for terminating modulated charging current at a maximum terminal voltage. The switch means 14 also produces a standby mode of operation so that when a battery is depleted below a preselected terminal voltage level the charging cycle is automatically restarted. A source of charging current through resistor 90 is also included which supplies current to a battery regardless of the operational mode of the charging control circuit and enables the recovery of deeply discharged batteries to a level where they are subject to normal cycling.

The power source 10 in the embodiment of FIG. 1 comprises a full wave DC rectifier including a transformer 16 having primary and secondary windings 17 and 18. A pair of similarly poled diodes 20 and 22 are connected between the terminals of the secondary winding and control circuit input terminals 24 and 26 to provide full wave rectification. A filter or smoothing capacitor 27 is preferably coupled across these input terminals.

For purposes of discussion, a charger for a 12 volt battery will be specifically described. Obviously the values would be adjusted for other batteries. An AC line voltage of 120 volts at 60 Hz at terminals 15 is applied to the primary 17 of transformer 16 and produces an unloaded rectified DC output voltage of about 18 volts across control circuit input terminals 24 and 26. The battery 12 under charge is connected across output terminals 28 and 30. A charging current supply lead 34 and series control transistor 40 are connected between input terminal 24 and output terminal 28. A current return path or negative ground bus 36 and current sensing network 77 connect output terminal 30 to input terminal 26. Sensing network 77 is a part of a current responsive switching means 14.

Transistor 40, having its emitter-collector circuit coupled to supply lead 34, permits the flow of unmodulated charging current to the battery 12 in one mode of operation. The collector 42 of transistor 40 is connected to input terminal 24, whereas emitter 44 is connected to output terminal 28. The base 46 of transistor 40 is connected through a resistor 48 to input terminal 24. When a normally discharged battery 12 is connected across the output terminals 28 and 30, bias current flows through the resistor 48 to the base 46 of the transistor 40, turning the transistor substantially fully on. The size of the resistor 48 determines the bias current to the base of the current modulating transistor 40. This, in turn, determines the charging current through the collector-emitter junction of the modulating transistor 40 to the battery 12 under charge. The bias resistor 48 is selected to provide saturation current in transistor 40 when the charger is connected to a normally discharged battery.

The base 46 of transistor 40 is also connected to the negative ground bus 36 through a series circuit 49 including a zener diode 50, a diode 52 and a resistor 54. When the base-emitter circuit of the transistor 40 is forward biased during charging of battery 12, the series circuit 49 including the zener diode 50 is effectively connected across the battery output terminals 28 and 30 and thereby senses the terminal voltage of the battery under charge. The series circuit is designed to monitor the terminal voltage of the battery 12. The zener diode 50, before the breakdown voltage of the diode is reached, presents a high impedance to current from the base 46 of the transistor 40, maintaining the transistor in the saturated state.

Modulation of the charging current is initiated at an intermediate voltage established by the breakdown voltage of zener diode 50. When the intermediate voltage threshold is exceeded, the series combination 49 begins to load the resistor 48 thus lowering the bias at base 46 of the transistor 40 and consequently the base current resulting in a tapering current through the transistor 40. As the battery 12 is raised progressively nearer the maximum terminal voltage, emitter charging current decreases resulting in reduced current through resistor 48, raising the potential at point 55 toward cut off of transistor 40. In an exemplary embodiment wherein a 12 volt battery is to be charged in the modulated mode to a maximum terminal voltage of about 14.4 volts at the end of the charge cycle, the optimum value of the intermediate voltage where the modulated mode begins is about 13.6 volts. Zener diode 50 is selected to have a breakdown voltage which provides this optimum value. The forward voltage drop across diode 52 compensates for the small drop across the base-emitter junction of transistor 40 resulting from current through resistor 48 and also protects the components in the event the battery is connected with reversed polarity. Resistor 54 is selected to provide a 0.8 volt drop if the battery is disconnected, thereby establishing the maximum charging voltage at which transistor 40 will cut off.

At the time the maximum terminal voltage is reached, the base-emitter junction of transistor 40 is biased substantially to cut off and substantially all the current through the bias resistor 48 flows through the series circuit 49. The voltage drop across the series circuit 49 is equal to the battery terminal voltage of 14.4 volts plus whatever small voltage drop exists across the base-emitter junction of transistor 40.

Without additional control, the circuit would seek to maintain the battery at 14.4 volt volts producing both an overcharging and an undesirable hunting of the control around the 14.4 volt level. Switch means 14, including transistor 60 and 70 and series circuit 49, automatically cut off the modulated charging mode and shift the charger into a float or standby mode thus avoiding these problems. Charging current is cut off when the battery terminal voltage during charging reaches 14.4 volts. The voltage of course drops immediately by an amount equal to the IR drop in the battery at the end of the modulated charge mode, and the terminal voltage will continue to fall during use. The modulated mode resumes when the battery terminal voltage falls below 13.6 volts as will be seen.

Negative output terminal 30 of the battery 12 is connected through a charging current sensing network 77 including the parallel combination of a resistor 76 and diode 78 to the negative terminal 26 of the DC power source 10. This current sensing network controls switch 14 in response to the amount of charging current. The base of transistor 70 is connected to the battery terminal 30 through resistor 74 and the emitter is connected directly to power source terminal 26 through bus 36 whereby the drop across network 77 provides the bias for transistor 70. The collector 84 of this transistor 70 is connected to the base 86 of the second switching transistor 60, and these are connected through a resistor 82 to the junction 83 between the diode 52 and the zener diode 50. The emitter-collector circuit of transistor 60 is connected in parallel with the resistor 54 and constitutes a controlled bypass switch.

Transistor 60 functions as a bistable switch whose state is controlled by the first transistor 70. When a normally discharged battery 12 is connected between the output terminals 28 and 30 and the charger is on, the charging current through the battery 12 produces a voltage drop across the first transistor's biasing network 77. The diode 78 limits the magnitude of this voltage drop to about .7 volts. This is sufficient to turn the first controlling transistor 70 sharply on. Under this operating condition, the emitter-collector circuit of this transistor is effectively a short circuit across the base-emitter junction of the second transistor switch 60. This transistor 60 is thereby biased to cutoff in which its emitter-collector circuit functions as an open switch in parallel with resistor 54. Under these bias conditions, either full rate or modulated charging current may be supplied to a depleted battery by modulating means 13.

After the breakdown voltage of zener diode 50 is exceeded, the current flowing through the zener diode 50 also flows through resistor 54 producing a voltage at terminal 55 equal to the zener voltage plus the IR drop across resistor 54. The value of resistor 82 is so large compared to resistor 54 that the current therethrough is insignificant.

The value of resistor 76 of network 77 is chosen to have an optimum value such that when the battery 12 is fully charged, the current through the battery and the biasing network 77 and the concomitant forward bias across the base-emitter junction of the switch control transistor 70 is insufficient to maintain the transistor in the saturated state. As this transistor 70 switches from the saturated to the cut off state, the transistor switch 60 is switched from the cut off to the saturated state. This bistable switch transistor 60 now functions as a closed switch, shorting out the resistor 54 and reducing the total voltage across the series circuit 49 to the sum of the reverse voltage across the zener diode 50 plus the forward voltage across the diode 52, a voltage slightly in excess of 13.6 volts. Because this is less than the terminal voltage of the charged battery 12, even with the charger switched off, the transistor 40 is cut off. The charging current through the current supply lead 34 to the battery 12 is thereby reduced to the level determined by resistor 90. With no significant charging current through the battery, the voltage drop across the resistor 76 is insufficient to switch transistor 70 on and thus the charger operates in a float mode at the intermediate voltage. The current through the resistor 48 and the zener diode 50 is applied via the current limiting resistor 82 to the base 86 of the second bistable switching transistor 60, holding this transistor on.

The terminal voltage of the battery 12 coupled across the output terminals 28 and 30 must fall to a value less than the bias voltage of zener diode 50 to forward bias the transistor and recommence the flow of charging current to the battery. This insures a desired hysteresis in the charge/discharge cycle to prevent overcharging and frequent cycling. When the battery voltage falls below the voltage at point 55, the voltage across the zener diode 50 falls below its breakdown voltage, terminating current flow through the series circuit 49 and through resistor 82 into the base of transistor 60 turning transistor 60 off. Transistor switch 60 of switching means 14 is thus returned to its initial state and the charging current through the battery and the biasing network 77 restores the forward bias to the control transistor 70, turning this transistor on and locking the bistable switch transistor 60 off even though the zener diode 50 will quickly become conductive again.

The reduced rate of charging current flow which ordinarily indicates a fully charged battery may be caused by a decrease in the applied line voltage or a similar external malfunction. If the battery voltage is about equal to or less then the intermediate terminal voltage, then the battery draws sufficient charging current to resume the charging cycle as soon as normal operating conditions are restored.

An abnormally discharged sealed lead acid battery, for example, one left standing in a discharged state for a long period, may exhibit a high input impedance. The consequent low current flow through the fully discharged battery presents the appearance of a fully charged battery to the battery charging circuit. To alleviate such a false indication of battery condition, current supply means including a resistor 90 is added to the circuit, connected from input terminal 24 to output terminal 28 in parallel with the collector-emitter circuit of the transistor 40 of current modulating means 13. It is known that a charging current of about one milliampere for each ampere hour of battery capacity will force a deeply discharged battery to accept some charging current, though it is not large enough to damage a normally charged battery. The value of resistor 90 is selected to provide charging current at about this rate. The normal charging process starts when the battery attains a charge sufficient to cause its impedance to drop.

In an illustrative application of this battery charging device wherein the voltage supplied from rectifier 10 is to be 18 volts, the charging current is to be modulated above an intermediate battery terminal voltage of 13.6 volts, the battery is to be charged to a maximum terminal voltage of about 14.4 volts and the switching circuit is to be locked in the standby mode down to a voltage of 13.6 volts, the component values for a particular battery charging circuit constructed according to the present invention are as follows: (The values are given for example only.)

Transistors

| | |
|---|---|
| T40 | 2N5293 |
| T60, T70 | 2N5183 |

Zener Diode

| | |
|---|---|
| D50 | Schauer SC13.6 |

Capacitor

| | |
|---|---|
| C27 | 500 $\mu$ farad |

Resistors

| | |
|---|---|
| R90 | 1.2K$\Omega$, ½W |
| R48 | 180 $\Omega$ |
| R54 | 47 $\Omega$ |
| R74 | 120 $\Omega$ |
| R76 | 10 $\Omega$ |
| R82 | 1.2K $\Omega$ |

The battery charging circuit disclosed may be used to charge batteries having a wide range of terminal voltage capacities. This flexibility is due to the zener diode being connected in series with the switching circuit, so that the state of the switching circuit initially depends on the operating state of the zener diode. The intermediate terminal voltage to which the battery is to be charged is adjusted by replacing zener diode 50 with one having a breakdown voltage bearing the necessary relationship to the intermediate terminal voltage. The zener diode breakdown voltage determines the intermediate terminal voltage level at which modulation of the charge current begins. This zener diode also determines the magnitude of the voltage down to which the battery charger is floated once it is fully charged.

Another embodiment of the battery charging circuit of this invention is disclosed in FIG. 2. The circuit includes a current modulating means 13 including a transistor 40. A charge indicating means 110 including a low value resistor 112 in parallel with a lamp 114 is connected into current supply lead 34 between the collector of the current regulating transistor 40 and the input terminal 24. The lamp glows brightly throughout the charging process due to the flow of current through the current supply lead and the collector-emitter circuit of transistor 40. As the battery charges and charge current flow correspondingly diminishes, the light dims. When the battery is fully charged the reverse biased transistor 40 terminates the flow of current through the supply lead 34, causing the light 114 to go out.

Switching means 124 of this embodiment includes a series circuit 130 comprising zener diodes 132 and 134, diode 106 and resistor 108. The diode 106 is poled oppositely to the zener diodes 132 and 134 to protect them from destruction caused by connecting a battery across output terminals 28 and 30 with a polarity opposite to that of the zener diodes. The resistor 108 provides the control over recycling of the charger, as already discussed above.

It should be readily apparent to those skilled in the art that the component values may be altered to meet other specific desired charging characteristics. Other transistors may also be substituted for those specifically disclosed herein, provided again that suitable changes in component values are made. In fact PNP type transistors may be substituted for the NPN transistors specifically disclosed provided that the polarity of the rectifier is reversed and necessary changes in component values are made.

While embodiments of this invention are shown and described herein, it is to be understood, of course, that the invention is not to be limited thereto, since many modifications may be made which fall within the true spirit and scope of this invention.

The invention having thus been described, what is claimed and desired to be secured by Letters Patent is:

1. A circuit for automatically charging a battery to establish a terminal voltage at an optimum voltage level comprising:
    source means for providing unilateral charging current;
    charging current modulating means connected in series between said source means and the battery and including a transistor having an emitter-collector circuit connected in series between said source means and the battery and a base electrode adapted to serve as a control terminal;
    means maintaining said modulating means in a maximum conductive condition for terminal voltages below a predetermined intermediate voltage level and including a bias current supplying resistance connected to said control terminal;
    means responsive to said terminal voltage between said intermediate voltage level and a maximum voltage level to deactivate said maintaining means and to permit said modulating means to modulate the rate of charging current to the battery and including a voltage breakdown device having a breakdown voltage about equal to said intermediate terminal voltage; and
    switch means responsive to the rate of charging current to substantially terminate said charging current through said modulating means to the battery when the charging current falls below a predetermined minimum and to thereafter prevent charging current through said modulating means to the battery for terminal voltages greater than a third predetermined voltage and including the parallel combination of a resistance and a first transistor adapted to function as a bistable switch, a second transistor adapted to control the state of said first transistor as a function of the terminal voltage on said battery and a biasing network connected to control said second transistor and in series with the battery so that said second transistor is responsive to the current through said battery, said parallel combination being connected in series with said voltage breakdown device and to said control terminal of said current modulating means and cooperating therewith so that as the terminal voltage of the battery increases, the supply of bias current to said modulating means transistor is reduced thereby modulating the rate of charging current flow to the battery as a function of the terminal voltage of the battery.

2. The circuit of claim 1 including means in series with said charging current modulating means and responsive to the state of said means to indicate that said modulating means is conducting current to the battery.

3. A circuit for automatically charging a battery to establish a terminal voltage at an optimum voltage level comprising:
    source means for providing unilateral charging current;
    charging current modulating means connected in series between said source means and the battery;
    means maintaining said modulating means in a maximum conductive condition for terminal voltages below a predetermined intermediate voltage level;
    means responsive to said terminal voltage between said intermediate voltage level and a maximum voltage level to deactivate said maintaining means and to permit said modulating means to modulate the rate of charging current to the battery and including a voltage breakdown device having a breakdown voltage about equal to said intermediate voltage level; and
    switch means responsive to the rate of charging current to substantially terminate said charging current through said modulating means to the battery when the charging current falls below a predetermined minimum and to thereafter prevent charging current through said modulating means to the battery for terminal voltages greater than a third predetermined voltage and including the parallel combination of a resistance and a switch device, the parallel combination being connected in series with said voltage breakdown device and to a control terminal of said current modulating means and cooperating therewith to modulate the rate of charging current flow to the battery as a function of the terminal voltage of the battery.

* * * * *